United States Patent
Thiers et al.

(10) Patent No.: US 7,527,856 B2
(45) Date of Patent: May 5, 2009

(54) ANTISTATIC LAYERED PANEL AND METHOD OF ITS MANUFACTURE

(75) Inventors: Bernard Paul Joseph Thiers, Oostrozebeke (BE); Peter Hochepied, Izegem (BE)

(73) Assignee: Flooring Industries Ltd., Dublin (IE)

( * ) Notice: Subject to any disclaimer, the term of this patent is extended or adjusted under 35 U.S.C. 154(b) by 0 days.

(21) Appl. No.: 10/535,188

(22) PCT Filed: Dec. 3, 2003

(86) PCT No.: PCT/EP03/13840

§ 371 (c)(1), (2), (4) Date: May 17, 2005

(87) PCT Pub. No.: WO2004/050359

PCT Pub. Date: Jun. 17, 2004

(65) Prior Publication Data

US 2006/0008630 A1 Jan. 12, 2006

(30) Foreign Application Priority Data

Dec. 4, 2002 (BE) .............................. 2002/0696

(51) Int. Cl.
*B32B 5/16* (2006.01)
(52) U.S. Cl. ............... 428/323; 428/330; 428/423.1; 427/212; 427/214; 427/322; 427/325; 427/326; 427/393; 427/408
(58) Field of Classification Search ............ 428/423.1, 428/323, 330; 427/212, 214, 322, 325, 326, 427/393, 408
See application file for complete search history.

(56) References Cited

U.S. PATENT DOCUMENTS

| 3,728,205 | A | | 4/1973 | Brindell |
| 4,472,474 | A | | 9/1984 | Grosheim et al. |
| 4,724,187 | A | * | 2/1988 | Ungar et al. ............... 428/408 |
| 4,743,510 | A | | 5/1988 | Nemeth |
| 5,001,015 | A | | 3/1991 | Havens |
| 6,006,486 | A | | 12/1999 | Moriau et al. |
| 6,786,019 | B2 | | 9/2004 | Thiers |
| 2003/0033777 | A1 | | 2/2003 | Thiers et al. |
| 2003/0136494 | A1 | | 7/2003 | Windmoller et al. |

FOREIGN PATENT DOCUMENTS

| DE | 101 15 567 C1 | | 8/2002 |
| EP | 1 225 038 | | 7/2002 |
| WO | 84/02881 | | 8/1984 |
| WO | WO84/02881 | * | 8/1984 |

* cited by examiner

*Primary Examiner*—Leszek Kiliman
(74) *Attorney, Agent, or Firm*—Bacon & Thomas, PLLC

(57) ABSTRACT

The invention relates to an antistatic layered panel (1) including a substrate (2) and one or more layers (3, 4) on top of said substrate, said one or more layers comprising a decorative covering layer (3). At least one of the layers on top of said substrate comprises a synthetic resin and is consolidated by pressure with one or more of the other layers. The panel contains at least one antistatic agent evenly distributed in said synthetic resin over the surface of the panel.

The invention relates also to methods of its manufacture and in particular to such antistatic laminated floor panels.

10 Claims, 1 Drawing Sheet

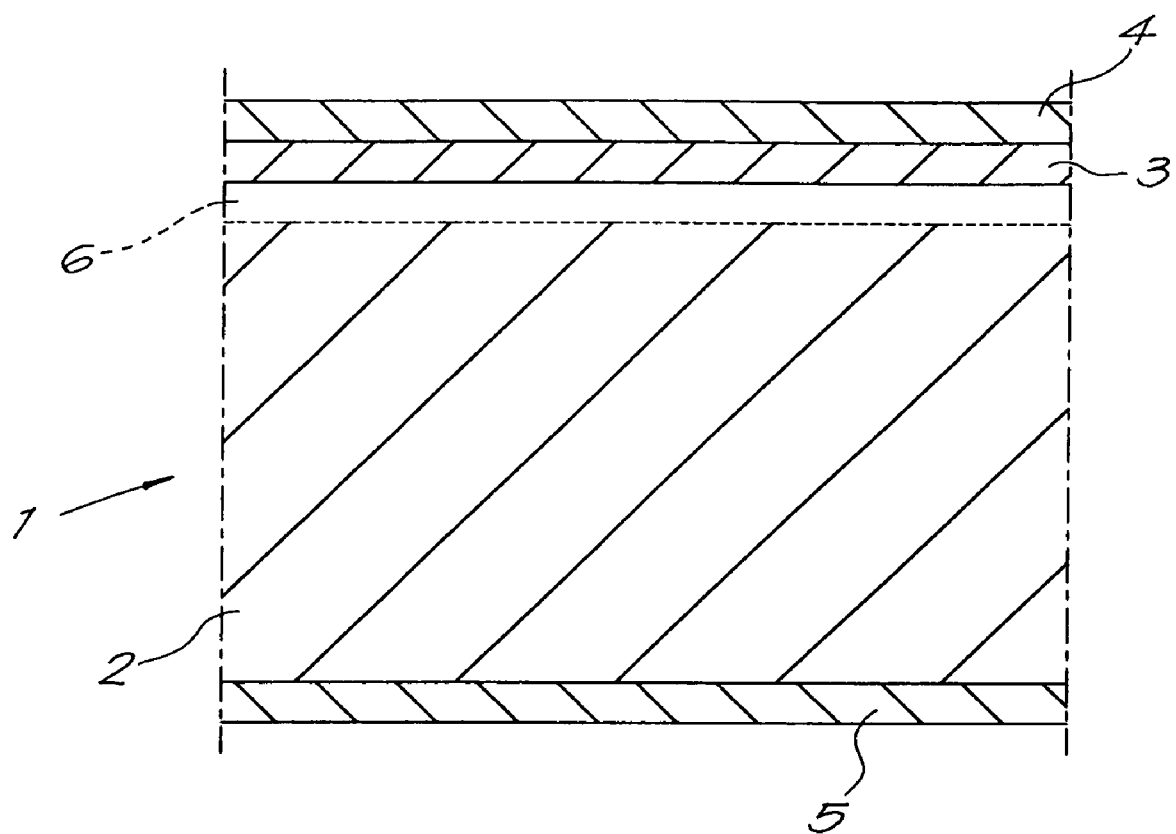

ANTISTATIC LAYERED PANEL AND METHOD OF ITS MANUFACTURE

TECHNICAL FIELD OF THE INVENTION

The invention relates to an antistatic layered panel and methods of its manufacture. In particular it relates to a covering panel, such as, for example, a laminated floor panel, wall panel or furniture panel. Normally, the panels according to the invention comprise a substrate or carrier layer which, at least on one side, are provided with a decorative covering layer and a top layer that contains synthetic material. The layers are normally laminated together in a hot press.

BACKGROUND OF THE INVENTION

It is generally known that many surfaces consisting of synthetic material are electrostatically charged by friction in an undesired manner. This charge can amount to more than 25 kV and suddenly be discharged when approaching an earthed object. It is known that when suddenly discharged, charges below 2 kV will not be experienced as inconvenient by human beings, however, will be inconvenient above such value. Above 4 kV, the discharges mostly even are experienced as painful. In order to prevent this, conductive fillers, e.g. in the form of powder or fibers, can be added to the synthetic material matrix next to this surface. Also, it is possible to use intrinsically conductive polymers as or nearby the synthetic material surface. Mostly, those measures however have a disadvantageous effect on the appearance of the surface.

From the German patent document no. 10115567, a floor panel for laminated floors is known with a glued and pressed wood-fibre board as a core layer, which is covered with a decorative layer and a wear resistant top layer (generally called "overlay") of synthetic material. Between the decorative layer and the top layer or between the decorative layer and the core layer, an intrinsically conductive polymer layer is provided, for example, a polyaniline layer. These conductive polymers are not only rather expensive, but the application thereof requires an additional production step. Moreover, when the conductive polymer layer is situated on top of the decorative layer, it will often somewhat discolour the decorative pattern or render it less transparent.

BRIEF DESCRIPTION OF THE INVENTION

The invention thus has the purpose to avoid one or more of said disadvantages by providing layered panels with a synthetic material surface at least on its upper side in which an antistatic character can be incorporated in a simple, economic and durable manner.

The invention also has the purpose to incorporate this antistatic character preferably without altering the other properties of the panel or of the synthetic material surface—eg. its hardness, colour or gloss—in an unacceptable manner. It is thus an important aspect of the invention to select suitable specific antistatic agents to avoid inter alia discoloration of the entire panel surface or of certain parts thereof when the agent would not be evenly distributed throughout its surface. The realisation of a uniform antistatic performance over the whole surface is then a consequence thereof.

Of course, the invention makes it possible to prevent inconvenient electric discharge shocks for persons in contact with the panels according to the invention, for example, when touching other (more or less earthed) objects. Due to this antistatic character, the tendency to attract dust on the surface of the panels is strongly reduced, as a result of which it must be cleaned less often.

It is however not possible in practice to entirely exclude any cleaning treatment. From time to time cleaning is required. The invention also has the purpose to allow the antistatic synthetic material surface to be cleaned periodically in a dry as well as a wet manner without diminishing the antistatic character.

This means that, as another object of the invention, the specific antistatic agents must not be leached out from the panel surface by water or other liquid cleaning means, due eg. to a too great affinity of the agents for such cleaning compositions. Certainly, when the concentration of antistatic agents must remain low to minimise the risk for discoloration, it is important that leaching out is avoided so as to retain a sufficient and durable antistatic effect with low concentrations.

Certain types of panels according to the invention eg. floor panels require in addition a wear resistant surface. The incorporation of wear resistant additives in a proper and effective combination with the antistatic agents is thus another purpose of the invention.

The manufacturing process of the panel according to the invention requires a hot pressing step against a metallic mould surface or press plate. This press plate can possess a relief surface, eg. embossed or in the form of very small ribs that imitate the grain or texture of a natural wood pattern. To work in an economically satisfactory manner the mould surface should remain intact for a great number of hot pressing cycles. It is thus important that the mould surface is not chemically attacked by the antistatic agents at the high moulding temperature. In addition, the mould surface should not be damaged during the pressing step by the hard wear resistant particles close to the panel surface.

It is thus a further object of the invention to provide a composition and a build-up of the stack of the panel layers, in particular close to the panel surface, that damage of the mould surface is avoided as good as possible.

According to the invention, the purposes stated above are achieved by providing a layered panel, including a substrate and one or more layers on top of said substrate, said one or more layers comprising a decorative covering layer, at least one of the layers on top of said substrate comprising a synthetic material, in particular a synthetic resin, extending over the whole surface of the panel, whereby said material is consolidated by pressure with one or more of the other layers and/or the substrate and wherein the panel contains at least one antistatic agent evenly distributed in said synthetic resin over the whole surface of the panel and preferably at least throughout a part of the thickness of the body of said synthetic material. According to an alternative, the antistatic agent can be evenly distributed in the subtrate or in the resin of a backing layer.

According to an important aspect of the invention, in production, the agent is dissolved in water or another solvent and the obtained solution is mixed into the synthetic material.

In a preferred method for manufacturing a layered panel according to the invention the various layers are stacked as self-supporting sheets upon each other, in the right sequence, and are consolidated by means of hot-pressing. Previous to said stacking the antistatic agent is directly dosed with the suitable quantity and mixed into the impregnating composition, generally a synthetic resin material, for any of the self-supporting sheets of the top or surface layer and/or of the decorative covering layer, and possibly also of other layers. Said sheets are subsequently impregnated with the so dosed composition. These impregnated sheets are then dried before said stacking.

Other aspects of the invention are clear of the further description and appended claims.

DETAILED DESCRIPTION OF THE INVENTION

For the invention, the meaning of the terms "covering layer" and "top layer containing synthetic material" is not limited to two or more different or quasi different layers. The terms as well include a single decorative covering layer which is impregnated with a synthetic material containing the antistatic agent, such that the upper surface thereof contains synthetic material, for example, such as with a melaminated (whether or not printed) sheet of paper. The terms also include a covering layer or foil which contains an antistatic agent, and entirely or almost entirely, consists of synthetic material and then thus of course does possess a surface of synthetic material.

Of course, the antistatic agent must be thermically stable up to approximately 200° if the object is manufactured by hot-pressing, for example, in a mould. Also, the antistatic agent must not be excessively chemically reactive in respect to constituents of the surrounding prepolymer or polymer of the covering layer or top layer.

According to the invention the antistatic agent preferably comprises a chemical composition of the type R—X with an hydrophobic organic radical R at one extremity of the molecule chain and with at the other extremity a chain moiety or rest comprising an element X, which rest has a limited affinity for water. Said composition is preferably a carbonic acid salt or carbonic acid ester, the carboxylate-rest [—COO]nX of which has a limited affinity for water. Herein, the value of n basically can lie between 1 and 3. Thereby, the disadvantages of the state of the art are avoided, in particular the required additional step during manufacturing. The carbonic acid (or fatty acid) can be a (saturated) alkane acid with one to five C atoms. The acid can also be unsaturated with one to five C atoms. It can be also be a higher fatty acid, however, a lower carbonic acid is preferred.

The ester or salt is most preferably potassium formiate (HCOOK) or sodium formiate (HCOONa). A mixture of both is possible as well as antistatic agent.

The antistatic agent can in general also consist of or comprise a salt, more particularly an alkali salt, such as NaCl or KCl, possibly in combination with the composition of the type R—X. The use of the salt NaCl only offers the particular advantage that it effectively avoids any discolouration of the decorative covering layer.

The added quantity of said antistatic agents in the synthetic material is preferably at least 2.5 g/m$^2$ of the covered surface, certainly for floor panels. For antistatic furniture panels with often a decorative covering layer on both sides or surfaces the quantity can even be lower.

The closer towards the outer surface of the panel the antistatic agent is incorporated, or the thinner the top layer, the smaller the required quantity of said agent is expected in order to achieve a sufficient antistatic effect. The surface resistance Rs of the object at its synthetic material surface preferably is less than $5 \times 10^{11}$ Ohm. As a result, the composition of the synthetic material surface of the panel can be viewed as belonging to the dissipative materials, a series between the conductive and insulating materials in the conductivity spectrum.

To provide the panels with a satisfactory wear resistant surface, the decorative covering layer can carry a surface layer whereby at least the latter comprises a synthetic resin and a wear resistant additive. In said case the antistatic agents are distributed in the synthetic resin of either said covering layer or said surface layer or in both of them. The concentration of these antistatic agents can thereby be highest at the interface of both layers. Said concentration can also be higher in the decorative covering layer than in the surface layer. Incorporation of the antistatic agents only or predominantly in the decorative covering layer and not expressly in the surface layer offers the advantage that possible discolouration due to the antistatic agents is less visible at the surface. Since the surface layer is then substantially free of antistatic agents such incorporation avoids in addition also any possible substantial chemical reaction with, or attack of the press plate when it stays in contact with the layered stack in the hot press.

The substrate of the panel can comprise a glued and pressed wood-based board, for example a MDF or HDF board or particle board or OSB (oriented structural board). The glue, as known, may be based on ureum formaldehyde or melamine ureum formaldehyde or isocyanates. The substrate may also be a gypsum plaster board or can comprise one or other synthetic material board, for example, a synthetic heat-insulating foam plate. The substrate may also be a panel based on wood, preferably a relatively soft kind of wood (softwood), such as pine wood, a multiplex wood layer, or can comprise on or more cork layers, for example, for sound-damping. Another possibility is that the substrate consists of extruded wood which usually is a mixture of PP/PE or PVC with 40 to 85% wood particles or fibers.

The decorative covering layer can be a paper layer impregnated with an aminoplastic synthetic material, for example, a melamine resin. It is optionally filled with a wear resistant additive such as corundum.

The surface layer can comprise one and the same or an analogous melamine or ureum resin which is filled with additives in order to enhance its wear resistance. These additives may comprise corundum. The surface layer can also comprise a mixture of melamine and ureum resin. The antistatic agent can be taken up, at least partially, in the impregnating resin for the decorative covering layer.

In certain cases it is preferred to provide panels comprising a substrate and a decorative covering layer but without additional surface layer on top of it. The wear resistant additives are then incorporated at least in the outer surface of said covering layer. The antistatic agents are then present in the body of said covering layer and optionally at its interface with said substrate.

The panel itself may either be flat, bent or corrugated. The moulding of the substrate of the panel can be performed in a press or in a mould.

A particular embodiment of the layered object according to the invention relates to a panel, in particular a so-called laminated floor panel with a MDF or HDF core and a decorative paper layer as a covering layer, with a transparent, wear-resistant synthetic layer as a top layer, and whereby the other side of the substrate or core layer is covered with a resin-impregnated paper backing layer.

Such floor panels mostly are of rectangular (oblong) or square (tiles) shape. The floor panels can have a thickness between 5 and 15 mm. Mostly, they are provided with complementary milled-out edge profiles, for example, snap-together profiles, as described in EP 843763 (U.S. Pat. No. 6,006,486) assigned to the owner of this application. These edge profiles allow a mutual coupling of the adjacent panels in order to form a so-called floating laminated floor.

The invention thus also relates to an antistatic floor which is composed of panels according to the invention. Of course, the invention is also applicable to other plate-shaped laminates, such as HPL (high pressure laminate) and DPL (direct pressure laminate), LPL (low pressure laminate) and CPL (continuous pressure laminate).

Further details will be set forth in reference to a laminated floor panel as an example, referring to the accompanying drawing. Of course, the application of the invention is not restricted to this form of embodiment. Additional aspects and advantages of the invention shall hereby be made clear.

The sole enclosed FIGURE schematically shows a cross-section of the layer structure in the panel.

The floor panel 1 according to the enclosed figure mostly comprises a MDF or HDF substrate or core layer 2. Usually, as a decorative covering layer 3, a sheet of paper, impregnated with melamine or ureum resin, or a mixture of both, is applied thereupon, which sheet is printed with a decorative pattern, for example, a parquetry floor motive or pattern. Thereupon, as a top layer 4, a surface layer is provided in the form of a transparent melamine or ureum resin composition (or mixture of both). This composition also comprises the necessary quantity of hard mineral particles, for example, corundum, in order to realize the desired wear resistance in the surface of the panel.

The decorative covering layer 3 can also comprise a wood veneer layer or thin cork layer. The back side of the core layer 2 in its turn is covered with a backing layer 5: for example, a resin-impregnated paper layer in order to obtain a perfectly flat and dimensionally stable sandwich structure for the laminate. This basic structure of laminated floor panels is generally known. An example of such floor panels is described in U.S. Pat. No. 6,006,486.

The invention also relates to a simple and flexible method for manufacturing such layered panels, in particular floor panels. According to this method, in the right working sequence, the various layers in the form of self-supporting sheets: a possible backing layer 5, the substrate or core layer 2, decorative covering layer 3 and top layer 4 are stacked upon each other and consolidated in a hot press to form a laminate. Thereby, the backing layer, covering and top layers are stacked in the shape of suitable previously impregnated and dried sheets with the core layer 2 interbetween.

The advantageous characteristic of the method relates to the fact that the specific antistatic agents simply can be dosed in the suitable quantity and stirred into the impregnating mixture for impregnating the various sheets themselves and thus also previous to their drying. In particular, the antistatic agent can also be mixed into the impregnating composition for the backing sheet 5 and/or into the additional layer (or sheet) 6.

It is even possible and recommended to add the necessary quantity of wear-resistant particles to the impregnating mixture for the top layer at the same time. Each press can be supplied by two or more parallel impregnating and drying lines for said sheets. It is also possible to provide, for example, a single line for separate impregnation of several sheets at the same time, followed by an oven with a sufficient drying capacity for drying the plurality of sheets. Here, the term "impregnate" must be seen in a broad sense. It comprises immersion in a bath as well as moisturizing or spraying, coating or covering by lick rollers or rolling-in of the impregnating composition (or mixture) or otherwise.

In an alternative method for manufacturing a layered panel the various layers 2-4 are stacked as self-supporting sheets upon each other, in the right sequence. They are consolidated by means of hot-pressing after that the antistatic agent is dosed with the suitable quantity at least in the underside of the covering layer 3 by spraying the surface of the core layer 2 with a solution of said agent.

The antistatic character of the panels according to the invention can be incorporated into the top layer 4 as follows. As known, the top layer traditionally is prepared by impregnating a thin paper-like substrate of cellulose fibers, comprising the necessary quantity of corundum powder, with a melamine composition. A suitable quantity of the antistatic agent, eg. of the type R—X, for example a formiate [HCOO]nX, or higher carbonic acid esters: [RnCOO]nX, now is added and homogeneously mixed into this melamine composition. The element X in the rest [—COO]nX preferably has a limited affinity for water. After impregnating this substrate with this composition and after drying, the obtained sheet, as a top layer 4, immediately before the pressing of the laminate, is put on top of the layered stack of the successive backing layer 5, carrier sheet or core layer 2 and covering layer 3. In the press, the stack is consolidated at a raised temperature at the suitable pressure, whereby the melamine or ureum compositions (including mixtures of both) of layers 5, 3 and 4 polymerise further. Hereby, the top layer 4 becomes quasi completely transparent, such that the decorative pattern of the covering layer 3 becomes visible through the top layer.

Presumably, the added antistatic agent, eg. of the type R—X, in particular a formiate or other ester or salt [RnCOO]nX functions as a so-called internal antistatic additive with a hydrophobic organic radical R at one extremity of the molecule chain and an hydrophilic rest X or rest [—COO]nX at the other extremity. It is known that such internal antistatic additives, by means of their organic radical part, at least partially dissolve in the surrounding polymer. The more hydrophilic chain end, for example, an ester (or salt) radical end, however, is drawn towards the surface of the polymer layer. Indeed, even with a low relative humidity of the environmental air, the average water concentration at the polymer layer surface is higher than the water concentration deeper beneath that surface in the polymer matrix. Thus, after a period of time, the internal antistatic agent could possibly migrate with its end X or salt rest towards the surface. By the adsorption and/or absorption there of air moisture, thus in or on the surface more or less electrically conductive paths are created, or even an ultrathin water film. Along these paths or film, the electrostatic charge, generated in the surface by friction, is dissipated over that surface. In other words, the charging is reduced.

Surprisingly, it seems that a rest end with a relatively limited affinity for water brings about a durable antistatic effect. The limited affinity namely reduces the leaching tendency by water, for example, when wet-cleaning the surface. The formation of electrically conductive paths thus is hardly counteracted or neutralized by contact with moisture. As a result of this reduced leaching tendency (by washing away), also the tendency of the internal antistatic agent, which is deeper in the polymer matrix, to migrate towards the synthetic surface might be suppressed in a purposeful manner. Thus, a premature depletion of the top layer 4 as a result of possible excessive migration of molecules of the internal antistatic agent towards the top surface is prevented.

The low concentration of carbonic acid esters (or salts) in the top layer, which suffices for the intended antistatic behaviour according to the invention, moreover does not prevent that the other features of the top layer can be maintained practically unaltered.

EXAMPLE 1

By means of the above-described method, as a test piece, a laminated floor panel with a thickness of 8 mm was manufactured with a MDF core layer and of the type "Quick-Step UNICLIC". In the top layer, 3.2 g/m$^2$ HCOOK was taken up evenly distributed. The formiate was added to the melamine mixture in a concentrated solution, in a ratio of approximately 3.5 weight % of the melamine quantity. The potassium formiate namely had been homogenously pre-mixed into the melamine bath before the impregnation of the sheet of cellulose paper and thus before the preparation of the top layer 4. As a reference, this panel according to the invention was compared to a standard panel "Quick-Step" whereby no HCOOK was taken up in the top layer.

The antistatic behaviour thereof was determined with the well-known walking test according to the standard EN-1815 (=ISO 6356), method A (laboratory conditions). It is known that, in order to be acknowledged as an antistatic panel, the measured charge value during the walking test must remain between −2 kV and +2 kV. For the walking test, sandals were applied, on one hand, with standardized BAM soles and, on the other hand, with standardized Neolit soles. For floor panels according to the invention, the average charge was −1455 V with BAM soles and −1442 V for Neolit soles. These values thus meet the antistatic test. For the standard floor panels as reference, however, values below −2 kV were measured, to wit of −3669 V with BAM soles and −5370 V with Neolit soles.

Thus, the application of a small quantity of potassium formiate in the top layer of layered panels suffices for giving them an antistatic character. From the results, it is also obvious that the applied salt has a suitable compatibility with (or solubility in) the applied melamine resin. The tendency to migrate appears neither to be too heavy (as a result of too small a compatibility) nor too weak (as a result of too high a compatibility). Moreover, the melamine resin obviously has the suitable (relatively low) cristallinity, such that sufficient amorphous zones are present through which the additive can possibly migrate (in order to compensate the relatively low affinity of the salt rest end for water).

Also, the surface resistance Rs (Ohm) of the test pieces was determined according to the DIN standard 54345 (=ISO 10965). For the "Quick-Step UNICLIC" panel according to the invention, $Rs = 2.50 \times 10^{10}$, thus, less than $5 \times 10^{11}$ Ohm, and for the reference panel, $Rs = 1.72 \times 10^{11}$.

EXAMPLE 2

As test piece, the same type of laminated floor panel as in Example 1 and the same reference panel were tested. In the test piece, however, no HCOOK was taken up in the top layer, but only approximately 15 weight % (10.4 g/m$^2$) of the solution potassium formiate in the melamine for the decorative layer 3. The antistatic effect, as determined by the same walking test as in Example 1, resulted in a charge of an average −633 V for BAM soles and −1586 V for Neolit soles. The reference panel showed a charge of −7225 V, −6069 V, respectively. The surface resistance Rs was $4.55 \times 10^{11}$ for the test piece and $5.00 \times 10^{11}$ for the reference panel, respectively.

Of course, it can also be useful and advantageous to incorporate the antistatic agents, eg. R—X, in particular the carbonic acid ester (or salt) in the top layer 4 as well as in the covering layer 3. In fact, it also suffices to mix a suitable quantity thereof into the impregnating resin for the decorative paper. Thereby, the resin reservoir layer for possible migration is increased to the sum of the thicknesses of top layer 4 and covering layer 3. At the same time, a bridge for conductive paths towards the core layer 2 is formed. If then also carbonic acid esters or salts are added to the glue for the wood particles of the core layer (for example, in the MDF boards), and possibly even to the resin of the backing layer 5, then it is possible to realize a kind of network of conductive paths through the entire or almost the entire thickness of the layered panel. This so-called network then may enhance the fast dissipation of the charges and possibly even creates an earthing effect for the panel.

However, sometimes it may suffice to apply an antistatic agent, eg. of the type R—X in the covering layer 3 only, thus, only next to the surface layer 4, in a quantity forming a sufficient reservoir for possible migration towards the panel surface through top layer 4, as shown in Example 2. One may even choose to add the antistatic agent (next to the surface layer 4) in an additional layer 6 between the covering layer 3 and core layer 2, when this covering layer 3 would not reduce the migration of the agent towards the surface of the panel too much.

This additional layer 6 may also be a substrate impregnated with a melamine or ureum composition or mixture of both, consisting of cellulose fibers analogous to the backing layer 5. Instead of putting this additional layer 6 in between, it is also possible to spray the upper surface of the core layer with a solution of the antistatic agent and if desired to dry this surface before covering it with layers 3 and 4. Likewise it is possible to spray the underside or the upperside or both sides of the decorative covering layer 3 with a solution of the antistatic agents. As a further alternative a solution of the antistatic agents can be sprayed on the underside of the surface layer 4 and dried thereon before the stacking operation.

If desired, the application of such additional layer 6, loaded with an antistatic agent, can be combined with a covering layer 3 and/or surface or top layer 4 in which also an antistatic agent is taken up. One may also consider combining an addition of the agent R—X, for example, the carbonic acid ester or salt in the top layer and/or covering layer with the application of R—X in and/or on the core layer 2 and/or with conductive fillers in the core layer. Short and thin metal fibers, for example, added (homogeneously distributed) in the glue for the core layer 2, can be applied as conductive fillers for this purpose. Finally, a small addition of the antistatic agent R—X in the top layer 4 and/or in the covering layer 3 and/or the additional layer 6 can be completed by adding suitable (small) quantities of other antistatic agents, such as, for example, GMS (glycerol monostearate) as lubricating agent or ethoxylated alkylamines or diethanolamides as an internal antistatic agents. The hydrophobous organic radical R in the agent does not necessarily have to be an aliphatic chain. It may also comprise cyclic (aromatic, alicyclic and/or heterocyclic) agents or cores.

The invention is particularly useful for laminated floor panels with chamfered edges, as described in patent application WO 01/96688 (U.S. Pat. No. 6,786,019) assigned to the owner of this application. At the level of these chamfered edges, decorative strips can be provided by means of transfer print or by other techniques, such as varnishing or laquering. These strips, however, mostly are not covered by a wear-resistant top layer, as the panel itself. Now, the utilization of an antistatic top layer according to the invention to a large extent prevents the attraction of dust by the board surface. Thus, the frequency of the number of required cleaning cycles will be reduced.

Also, a sound-reducing intermediary layer, for example, in the form of one or more thin cork sheets or elastomer sheets, can be included below the covering layer 3, corresponding to the teachings from PCT/EP0208924 WO 03/016655 (U.S. 2003/0033777) based on BE 2001/0547 filed Aug. 14, 2001, assigned to the owner of this application. If necessary, the thin cork or elastomer sheets also can be previously impregnated or treated with one or other antistatic agent, in particular an R—X additive according to the invention, and possibly in order to replace the additional layer 6.

When the decorative layer is provided with a printed wood design, such as, for example, in laminated floor panels, it is finally possible to press a relief pattern of wood nerves matching this wood design during the hot-pressing step into the outer surface of the top layer 4. In this way, the appearance of real floors is imitated in a very realistic manner.

Finally, the invention relates to an antistatic single-layer panel, preferably a hot-pressed board, comprising an aggregate of solid particles which are held together by a synthetic material-containing glue. This single-layer panel can be a glued wood-chip board, more particularly particle board or wood-fibre board, such as a MDF or HDF board. It may also be an OSB board. The antistatic character of the single-layer panel also is obtained by incorporating a suitable quantity (minimum 3 weight % of the quantity of glue) of the above-described antistatic agents evenly distributed in the glue phase of the panel. During manufacturing or subsequently, the panel can, for example, be directly printed with a decorative pattern. It can also be used as an antistatic substrate or other intermediate product for manufacturing a layered panel, as described hereinbefore. In particular, it can be used as a substrate for so-called melamine boards. These are layered boards with a decorative layer, however, without wear-resistant top layer and possibly without backing layer. In this single-layer panel, the antistatic agents also can possibly migrate somewhat towards the surface, via the glue matrix.

The invention claimed is:

1. Method for manufacturing a layered floor panel;

said floor panel comprising a substrate, one or more layers on top of said substrate and at least one backing layer underneath said substrate, said substrate being a glued and pressed wood-based board comprising a material selected from the group consisting of MDF, HDF, particle board, oriented structural board and multiplex;

said one or more layers at least comprising a wear resistant surface layer filled with wear resistant additives as a top layer and a decorative covering layer;

said wear resistant surface layer and said decorative covering layer extending over substantially the whole surface of the panel;

at least one of said wear resistant surface layer and said decorative covering layer including a resin impregnated paper layer, said wear resistant surface layer and said decorative covering layer being substantially free from conductive fillers in the form of fibers;

said floor panel containing at least one antistatic agent distributed in said resin;

wherein the method at least comprises the steps of:

dosing and mixing said antistatic agent into the impregnating composition for said resin impregnated paper layer;

impregnating said paper layer, thereafter drying said resin impregnated paper layer;

and thereafter stacking at least said wear resistant surface layer, said decorative covering layer, said substrate and said backing layer upon each other and consolidating said layers and substrate to form a plate-shaped direct pressure laminate (DPL) by means of hot pressing.

2. Method according to claim 1, wherein said backing layer includes a resin impregnated paper layer, and wherein said antistatic agent also is mixed into the impregnating composition for the sheet of the backing layer and/or into an additional layer.

3. Method according to claim 1, wherein said decorative covering layer includes said resin impregnated paper layer;

wherein said print is provided on said paper layer, and the upper surface of the decorative layer is sprayed with a solution of the antistatic agent and further covered with a surface layer comprising wear resistant additives.

4. Method according to claim 3, wherein the wear resistant additives are distributed in the lower part of said surface layer.

5. Method according to claim 4, wherein said surface layer is a self supporting cellulose fiber sheet impregnated with melamine and/or ureum resin having in its lower part wear resistant corundum particles distributed therein.

6. The method according to claim 1 or 3, wherein said antistatic agent comprises a salt.

7. The method according to claim 6, wherein said salt is NaCl.

8. The method according to claim 6, wherein said salt is KCl or a combination of NaCl and KCl.

9. The method according to claim 1 or 3, wherein said method comprises the step of providing said floor panel with complementary milled-out edge profiles; said profiles allowing a mutual coupling of the adjacent panels in order to form a floating laminated floor.

10. The method according to claim 1 or 2, wherein said decorative covering layer includes said resin impregnated paper layer and wherein said print is provided on said paper layer.

* * * * *